(12) United States Patent
Peretz et al.

(10) Patent No.: US 10,579,168 B2
(45) Date of Patent: Mar. 3, 2020

(54) DUAL LED DRIVE CIRCUIT

(71) Applicant: Microsoft Technology Licensing, LLC, Redmond, WA (US)

(72) Inventors: Ahia Peretz, Ramat-Gan (IL); Ilan Geller, Pardesiya (IL); Vadim Mishalov, Tel-Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 219 days.

(21) Appl. No.: 15/474,470

(22) Filed: Mar. 30, 2017

(65) Prior Publication Data
US 2018/0284910 A1   Oct. 4, 2018

(51) Int. Cl.
*G06F 3/038* (2013.01)
*G06F 3/0354* (2013.01)
(Continued)

(52) U.S. Cl.
CPC .......... *G06F 3/0383* (2013.01); *G06F 3/0386* (2013.01); *G06F 3/03545* (2013.01);
(Continued)

(58) Field of Classification Search
CPC .... G06F 3/0383; G06F 3/03545; G06F 3/041; G06F 2203/04108; H05B 33/0845
See application file for complete search history.

(56) References Cited

U.S. PATENT DOCUMENTS 4,672,154 A * 6/1987 Rodgers .............. G06F 3/03545
178/19.07
5,528,022 A * 6/1996 Nakazawa ......... G06K 7/10851
235/436
(Continued)

FOREIGN PATENT DOCUMENTS

JP          2008123082        *   5/2008
JP          2008123082 A        5/2008
(Continued)

OTHER PUBLICATIONS

Cho, et al., "Color Tunable Light-Emitting Diodes with Modified Pulse-Width Modulation", In Journal of Physica Status Solidi, Rapid Research Letter, vol. 3, No. 9, Sep. 11, 2009, 2 pages.
(Continued)

*Primary Examiner* — Benyam Ketema
(74) *Attorney, Agent, or Firm* — Alleman Hall Creasman & Tuttle LLP (57) ABSTRACT

A circuit, includes a first node, a positive voltage generator electrically connected to the first node, a negative voltage generator electrically connected to the first node in parallel with the positive voltage generator, a second node, an electrical connector electrically connecting the first node to the second node, a first light emitting diode (LED) electrically intermediate the second node and ground, and a second LED electrically intermediate the second node and ground in parallel with the first LED. The first LED is configured to activate based on the negative voltage generator supplying a negative voltage to the second node via the first node. The
(Continued)

second LED is configured to activate based on the positive voltage generator supplying a positive voltage to the second node via the first node.

18 Claims, 3 Drawing Sheets

(51) Int. Cl.
*H05B 33/08* (2020.01)
*G06F 3/041* (2006.01)

(52) U.S. Cl.
CPC ......... *G06F 3/041* (2013.01); *H05B 33/0845* (2013.01); *G06F 2203/04108* (2013.01)

(56) References Cited

U.S. PATENT DOCUMENTS

| | | | | |
|---|---|---|---|---|
| 5,617,304 | A * | 4/1997 | Huang | B43K 29/10 362/118 |
| 7,161,578 | B1 * | 1/2007 | Schneider | G02B 27/20 345/156 |
| 7,626,575 | B2 | 12/2009 | Cho et al. | |
| 8,134,542 | B2 * | 3/2012 | Hagen | G06F 3/046 178/18.01 |
| 8,638,320 | B2 | 1/2014 | Harley et al. | |
| 8,928,635 | B2 | 1/2015 | Harley et al. | |
| 9,158,393 | B2 | 10/2015 | Vlasov | |
| 9,329,703 | B2 | 5/2016 | Falkenburg et al. | |
| 2002/0021291 | A1 | 2/2002 | Cook | |
| 2006/0028458 | A1 | 2/2006 | King et al. | |
| 2009/0167728 | A1 | 7/2009 | Geaghan et al. | |
| 2013/0009560 | A1 * | 1/2013 | Takeda | H05B 33/0818 315/201 |
| 2013/0106797 | A1 * | 5/2013 | Pant | G06F 3/0383 345/179 |
| 2013/0207938 | A1 * | 8/2013 | Ryshtun | G06F 3/0416 345/179 |
| 2013/0214703 | A1 * | 8/2013 | Bouchard | G01K 7/22 315/309 |
| 2014/0002422 | A1 * | 1/2014 | Stern | G06F 3/03545 345/179 |
| 2014/0160091 | A1 | 6/2014 | Mann | |
| 2014/0306940 | A1 * | 10/2014 | Fukushima | G06F 1/1626 345/179 |
| 2017/0277286 | A1 * | 9/2017 | Chiu | G06F 3/03545 |
| 2018/0052531 | A1 * | 2/2018 | Peretz | G06F 3/016 |

FOREIGN PATENT DOCUMENTS

| | | |
|---|---|---|
| WO | 2013122699 A1 | 8/2013 |
| WO | 2013165466 A1 | 11/2013 |

OTHER PUBLICATIONS

"International Search Report & Written Opinion Issued in PCT Application No. PCT/US2018/023903", dated Jun. 7, 2018, 14 pages.

"Streamlight 65006 Stylus 3-AAAA LED Pen Light, Black with Red Beam, 6-1/4-Inch", Available at: https://www.amazon.com/Streamlight-65006-Stylus-3-AAAA-4-Inch/dp/B00008BFS2 Retrieved on: Dec. 9, 2016, 8 pages.

* cited by examiner

DUAL LED DRIVE CIRCUIT

BACKGROUND

An active stylus may include one or more light emitting diodes (LEDs) that may be activated to indicate various operating states of the active stylus. For example, an LED may be activated to indicate that the active stylus is turned on. In another example, an LED may be activated (e.g., blinking/flashing) to indicate that the active stylus is currently communicating with a host computing device, such as a touch-sensitive display device. In yet another example, an LED may be activated to indicate a battery state of charge of the active stylus.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A circuit includes a positive voltage generator electrically connected to a first node. A negative voltage generator is electrically connected to the first node in parallel with the positive voltage generator. The circuit further includes an electrical connector electrically connecting the first node to a second node. A first LED is electrically intermediate the second node and ground, and a second LED is electrically intermediate the second node and ground. The first LED is configured to activate based on the negative voltage generator supplying a negative voltage to the second node via the first node. The second LED is configured to activate based on the positive voltage generator supplying a positive voltage to the second node via the first node.

DETAILED DESCRIPTION

An active stylus includes various hardware components that enable operation of the active stylus, and more particularly, communication with a touch-sensitive display in order to provide touch and/or hover input to the touch-sensitive display. For example, such hardware components may include a microcontroller unit (MCU), a power management unit (PMU), application-specific integrated circuits (ASICs), and a radio transceiver. In one example, the hardware components may be incorporated into a unified hardware core. For example, the unified hardware core may occupy less space within an interior cavity of the active stylus relative to discrete components. Additionally, the active stylus may include additional hardware components that are remotely positioned from the unified hardware core. In one example, the active stylus includes two light emitting diodes (LEDs) remotely positioned from the unified hardware core. Each of the two LEDs may be electrically connected to the unified hardware core via a separate electrical connector (e.g., lines, wires) that extend throughout the interior cavity of the active stylus.

By using multiple electrical connectors to electrically connect the LEDs to the unified hardware core, the cost and complexity of the active stylus is increased. Further, the multiple connectors occupy more space that results in an increase in size of the active stylus. Further still, by using multiple electrical connectors, the number of possible failure points of the active stylus is increased resulting in reduced reliability of the active stylus.

Accordingly, the present disclosure is directed to an active stylus including two LEDs that are electrically connected to a drive circuit via a single electrical connector. In particular, the drive circuit is configured to selectively drive either of the LEDs. The first LED is activated by supplying a negative voltage through the electrical connector. The second LED is activated by supplying a positive voltage through the electrical connector.

By using the specifically configured drive circuit to control both of the LEDs through a single electrical connector, a number of electrical connectors used to electrically connect the LEDs may be reduced. By reducing the number of electrical connectors in the active stylus, a cost, size, and complexity of the active stylus may be reduced. Further, a reliability of the active stylus may be increased.

Figure 1:
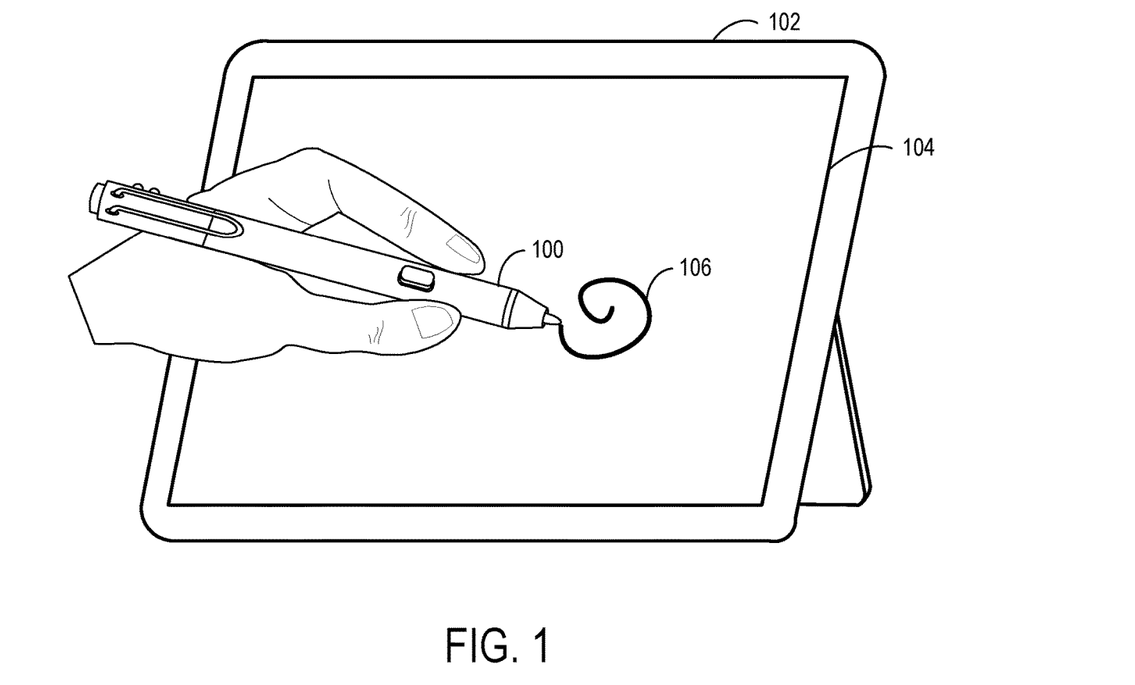
FIG. 1 shows an active stylus providing input to a touch-sensitive display device.

FIG. 1 shows an active stylus 100 interacting with a touch-sensitive display 102. The touch-sensitive display 102 includes a sensor 104 configured to detect touch and/or hover input from the active stylus 100. In one example, the active stylus 100 is configured to generate an electrical signal that is detected by the sensor 104. In other implementations, the stylus 100 may be configured to provide passive stylus input in which the stylus 100 does not produce an electrical signal. The sensor 104 may be configured to receive input from input sources in direct contact with a surface of the touch-sensitive display 102, and/or, input from input sources not in direct contact with the touch-sensitive display 102 (e.g., input devices that hover proximate to a surface of the display). The sensor 104 may take any suitable form including, but not limited to, one or more of a capacitive sensor and/or display, a resistive sensor and/or display, and an optical sensor and/or display. In one example, the sensor 104 includes a matrix of electrodes that form capacitors whose capacitances may be evaluated in detecting stylus input.

Furthermore, the active stylus 100 may be configured to provide user input to the touch-sensitive display 102 in forms other than direct stylus input that is detected by the sensor 104. For example, the active stylus 100 may be configured to communicate with the touch-sensitive display via a wireless communication link (e.g., Wi-Fi, Bluetooth).

The touch-sensitive display 102 may be configured to visually present appropriate graphical output 106 in response to receiving information from the active stylus 100. Such information may be based on stylus input as well as other user input. While described with reference to a touch-sensitive display device, stylus 100 may optionally be used with touch-sensing surfaces that do not include display functionality.

Figure 2:
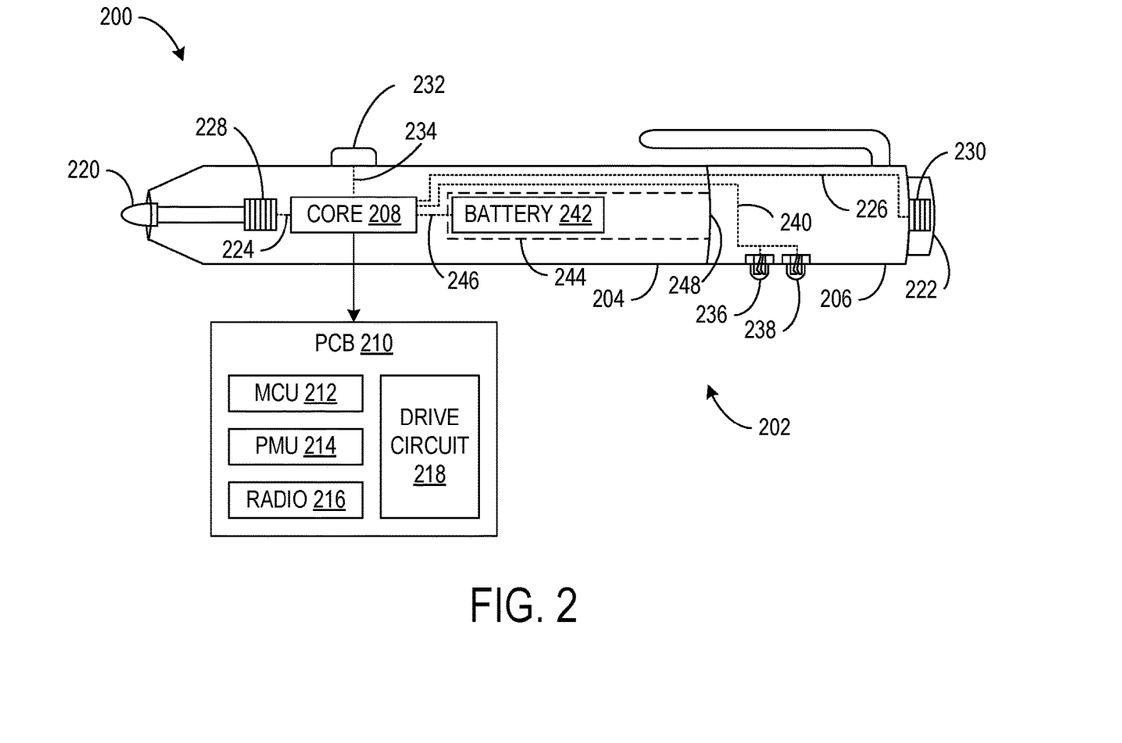
FIG. 2 shows a stylus including a pair of light emitting diodes (LEDs) electrically connected, via a single electrical connector, to a circuit for controlling the LEDs.

FIG. 2 schematically shows an example active stylus 200 including various hardware components that enable operation of the active stylus to provide various forms of user input to a computing device, such as the touch-sensitive display 102 of FIG. 1. The active stylus 200 is an example of the active stylus 100 of FIG. 1. The active stylus 200 is shown in simplified form. The active stylus 200 includes an elongate gripping member 202 including a front end 204 and a tail end 206.

A unified hardware core 208 is positioned within the front end 204 of the elongate gripping member 202. The unified hardware core 208 includes a plurality of hardware components mounted onto a same printed circuit board (PCB) 210. In the depicted example, the plurality of different hardware components includes a controller or microcontroller unit (MCU) 212, a power management unit (PMU) 214, a communication interface 216, and a drive circuit 218. Any suitable hardware component may be mounted to the PCB 210 and incorporated into the unified hardware core 208.

Furthermore, the active stylus 200 includes additional components that are remotely positioned from the unified hardware core 208 and electrically connected to the unified hardware core 208. The front end 204 of the elongate gripping member 202 terminates at an electrode writing tip 220. The tail end 206 of the elongate gripping member 202 terminates at an electrode eraser 222. The electrode writing tip 220 and the electrode eraser 222 may be electrically conductive and configured to send/receive current when proximate to an electrode of a touch sensor, such as the sensor 104 of FIG. 1. The electrode writing tip 220 may be electrically connected to the unified hardware core 208 via an electrical connector 224. The electrode eraser 222 may be electrically connected to the unified hardware core 208 via an electrical connector 226.

As used herein, an electrical connector means a physical link between components that facilitates the transmission of electrical energy. An electrical connector may take any suitable form. In one example, an electrical connector is a wire. In another example, an electrical connector is a cable.

In some implementations, the electrode writing tip 220 includes a pressure sensor 228 configured to detect a pressure when the electrode writing tip 220 is pressed against a surface. Likewise, the electrode eraser 222 includes a pressure sensor 230 configured to detect a pressure when the electrode eraser 222 is pressed against a surface. In one example, each of the pressure sensors 228 and 230 are force sensitive resistors. Each of the respective pressure sensors 212 and 214 may send touch pressure data to the MCU 212 via electrical connectors 224 and 226.

A barrel switch button 232 protrudes from the elongate gripping member 202. The barrel switch button 232 is electrically connected to the unified hardware core 208 via an electrical connector 234. The barrel switch button 232 is configured to be depressable to provide user input to the active stylus 200. In particular, a state (e.g., depressed or undepressed) of the barrel switch button 232 may be sent to the MCU 212 via an electrical connector 234. The state of the barrel switch button 232 may correspond to any suitable user input information. In one example, the barrel switch button 232 may provide functionality similar to a "right click" mouse button. In some implementations, the barrel switch button 232 may be incorporated into the unified hardware core 208 and mounted on the PCB 210.

A first light emitting diode (LED) 236 and a second LED 238 are positioned in the tail end 206 of the elongate gripping member 202. The first and second LEDs 236 and 238 are electrically connected to the unified hardware core 208 via a single electrical connector 240. In particular, the MCU 212 may provide various control signals to the drive circuit 218 to control activation of the first and second LEDs 236 and 238 as will be discussed in further detail below with reference to FIG. 3.

The first and second LEDs 236 and 238 may be selectively activated by the MCU 212 to indicate various operating states or conditions of the active stylus 200. For example, an LED may be activated to indicate that the active stylus is turned on. In another example, an LED may be activated (e.g., blinking/flashing) to indicate that the active stylus is currently communicating with a host computing device, such as the touch-sensitive display 102 of FIG. 1. In yet another example, an LED may be activated to indicate a battery state of charge of the active stylus. The LEDs may be activated for any purpose without departing from the scope of this disclosure.

The first and second LEDs 236 and 238 may be configured to selectively activate based on receiving different polarity voltages from the drive circuit 218 based on the drive circuit 218 receiving a control signal from the MCU 212. In one example, the first LED 236 is configured to activate based on the drive circuit 218 supplying a negative voltage through the electrical connector 240 to the first LED 236. On the other hand, the second LED 238 is configured to activate based on the drive circuit 218 supplying a positive voltage through the electrical connector 240 to the second LED 238.

The first and second LEDs 236 and 238 may be any suitable size. The first and second LEDs 236 and 238 may be any suitable color. In one example the first LED 236 is red and the second LED 238 is green. In some implementations, the active stylus 200 may include more than two LEDs.

A battery 242 is positioned in a battery compartment 244 formed within the front end 204 of the elongate gripping member 202. The battery 242 is electrically connected to the unified hardware core 208 via an electrical connector 246. The battery 242 provides electrical power to the unified hardware core 208 to power the active stylus 200. Any suitable type of battery may be used to power the active stylus 200.

In some implementations, the elongate gripping member 202 may form a mechanical break 248 intermediate the front end 204 and the tail end 206. The mechanical break 248 may enable physical separation of the front end 204 from the tail end 206 to allow access to the battery compartment 244 in order to replace the battery 242. In such an implementation, the electrical connectors connected to components positioned in the tail end 206 may be exposed when the front end 204 and the tail end 206 are separated to access the battery compartment 244. Further, the electrical connectors 226 and 240 may include a selective mechanical break that aligns with the mechanical break 248 in order to allow physical separation of the front end 204 and the tail end 206. It may be desirable to limit the number of electrical connectors that extend into the tail end 206 in order to simplify the electromechanical connection and/or reduce potential failure points. In particular, it may be desirable to electrically connect both of the first and second LEDs 236 and 238 to the unified hardware core 208 via the single electrical connector 240.

As discussed above, the unified hardware core 208 includes a plurality of hardware components including the MCU 212, the PMU 214, the communication interface 216, and the drive circuit 218, each of which is mounted on the same PCB 210, although plural PCBs may be used in other implementations.

The MCU 212 may be configured to control operation of the active stylus 200. More particularly, the MCU 212 may be configured to derive stylus input information from the signals received from the electrodes 220 and 222, and when applicable, the pressure sensors 228 and 230. The MCU 212 may be configured to receive signals from the barrel switch button 232. Further, the MCU 212 may be configured to send, via the communication interface 216, the stylus input information and button state information to a touch-sensitive device, such as the touch-sensitive display 102 of FIG. 1.

Furthermore, the MCU 212 may be configured to provide different control signals to the drive circuit 218 to selectively activate the first and second LEDs 236 and 238. In particular, the drive circuit 218 may be configured to supply a negative voltage through the electrical connector 240 based on the control signal received from the MCU 212, and the first LED 236 may be configured to activate based on being supplied with the negative voltage. Further, the drive circuit 218 may be configured to supply a positive voltage through the electrical connector 240 based on a different control signal received from the MCU 212, and the second LED 238 may be configured to activate based on being supplied with the positive voltage.

The MCU 212 may control the LEDs via the drive circuit 218 using any type of control signals. In one example, the MCU 212 provides different pulse-width-modulated (PWM) control signals to the drive circuit 218 to separately activate the first and second LEDs 236 and 238. In some implementations, the MCU 212 may be configured to adjust one or more of a PWM frequency and a duty cycle of the PWM control signals to adjust a perceived brightness of either of the first and second LEDs 236 and 238. For example, the MCU may increase the PWM frequency and/or the duty cycle of the PWM control signals to increase the perceived brightness of either of the first and second LEDs.

In some implementations the first and second LEDs may be controlled via an integrated circuit (IC) instead of the MCU. In some such implementations, the IC may be configured to adjust the perceived brightness of the first and/or second LEDs by adjusting a parameter of the positive or negative voltage provided to the first and second LEDs, respectively. For example, the IC may be configured to adjust the positive voltage amplitude to adjust the perceived brightness of the first LED, and adjust the negative voltage amplitude to adjust the perceived brightness of the second LED. In another example, the IC may be configured to adjust the current drawn from the positive voltage to adjust the perceived brightness of the first LED, and adjust the current drawn from negative voltage to adjust the perceived brightness of the second LED.

The PMU 214 is configured to monitor and control various power related operations of the active stylus 200. For example, the PMU 214 may be configured to monitor and control operation of the battery 242 to supply power to the hardware components of the unified hardware core 208. Further, the PMU 214 may be configured to wake up or shut down hardware components as part of controlling sleep and power functions (e.g., on and off) of the active stylus 200.

The communication interface 216 may be configured to communicatively couple the active stylus 200 with one or more touch-sensitive display devices or other computing devices. The communication interface 216 may include any suitable wireless communication hardware. In one example, the communication interface 216 includes a personal area network transceiver (e.g., a Bluetooth transceiver). In another example, the communication hardware establishes an electrostatic communication channel between the active stylus 200 and a touch-sensitive display device through a capacitive coupling of the electrode writing tip 220 or the electrode eraser 222 and one or more electrodes of a touch sensor of the touch-sensitive display device. The communication interface 216 may employ any suitable type and/or number of different communication protocols to communicatively couple the active stylus 200 with a touch-sensitive display device or other computing device.

The drive circuit 218 is configured to supply positive or negative voltages through the electrical connector 240 to independently selectively activate the first LED 236 or the second LED 238 based on the control signals received from the MCU 212. In some implementations, the elongate gripping member 202 may include metal. In some such implementations, the metal elongate gripping member may electrically connect to the drive circuit 218 and serve as ground for the drive circuit 218.

The above described hardware components incorporated into the unified hardware core 208 may include any suitable computing hardware. For example, one or more of the hardware components may include a logic machine and a storage machine configured to hold instructions executable by the logic machine to perform the various operations discussed herein. In one example, one or more of the hardware components may be discrete integrated circuits (ICs). In another example, the functionality of multiple components may be integrated into the same IC, such as a system on a chip (SoC).

Figure 3:
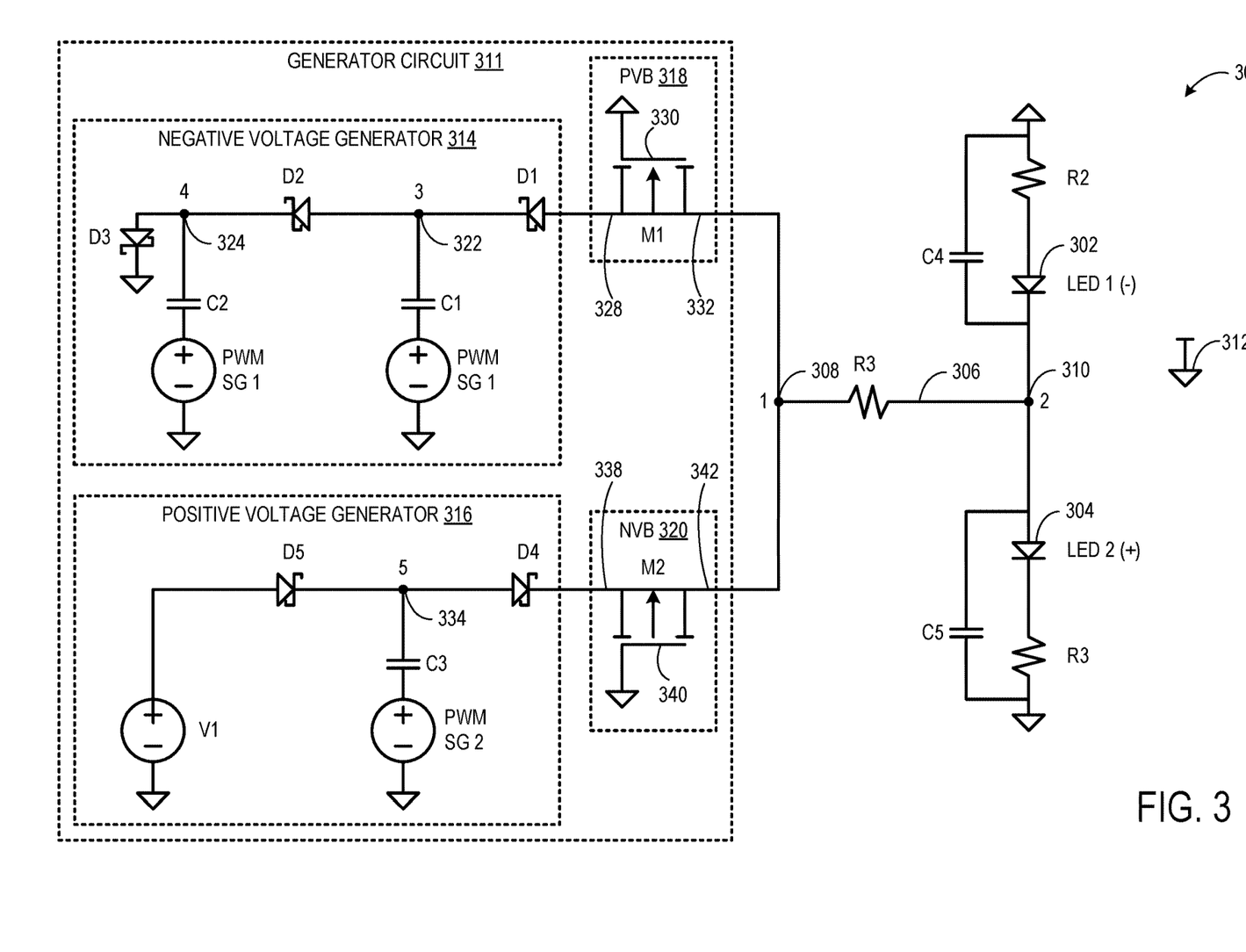
FIG. 3 shows a circuit configured to control activation of two LEDs connected to the circuit via a single electrical connector.

FIGS. 3 schematically shows an example drive circuit 300 configured to independently control a first LED 302 and a second LED 304 both connected to the drive circuit 300 by a same electrical connector 306. The drive circuit 300 is an example of the drive circuit 218 of FIG. 2. The drive circuit 300 includes a first node 308 formed at a first end of the electrical connector 306 and a second node 310 formed at a second, opposing end of the electrical connector 306. In other words, the electrical connector 306 electrically connects the first node 308 to the second node 310. In the implementation of FIG. 2, electrical connector 240 is analogous to electrical connector 306. Like electrical connector 240, electrical connector 306 optionally may include a selective break, for example to allow a stylus to be opened for battery insertion.

The first LED 302 is electrically intermediate the second node 310 and ground 312. In particular, the first LED 302 is oriented such that the first LED 302 is configured to activate based on a negative voltage being supplied through the second node 310. The second LED 304 is electrically intermediate the second node 310 and ground 312. In some implementations in which the drive circuit 300 is implemented in an active stylus having an elongate gripping member that includes metal, the metal elongate gripping member may be electrically connected to the drive circuit 300 and may serve as ground. The second LED 304 is electrically connected to the second node 310 in parallel with the first LED 302. In particular, the second LED 304 is oriented such that the second LED 304 is configured to activate based on a positive voltage being supplied through the second node 310.

A generator circuit 311 is electrically connected to the first node 308. The generator circuit 311 is configured to supply a negative voltage or a positive voltage to the first node to control activation of the first LED 302 and the second LED 304.

In one example, the generator circuit 311 includes a negative voltage generator 314 electrically connected to the first node 308. The negative voltage generator 314 is configured to supply a negative voltage to the second node 310 via the first node 308 based on a PWM signal output from a first PWM signal generator PWM SG1 of the negative voltage generator 314.

The generator circuit 311 further includes a positive voltage generator 316 is electrically connected to the first node 308 in parallel with the negative voltage generator 314. The positive voltage generator 316 is configured to supply a positive voltage to the second node 310 via the first node 308 based on a PWM signal output from a second PWM signal generator PWM SG2 of the positive voltage generator 316.

The generator circuit 311 further includes a positive voltage block 318 is positioned intermediate the negative voltage generator 314 and the first node 308. The positive voltage block 318 is configured to allow the negative voltage generated by the negative voltage generator 314 to be supplied to the first node 308. The positive voltage block 318 is further configured to prevent the positive voltage produced by the positive voltage generator 316 from shorting to ground through the negative voltage generator 314.

The generator circuit 311 further includes a negative voltage block 320 is positioned intermediate the positive voltage generator 316 and the first node 308. The negative voltage block 320 is configured to prevent the negative voltage produced by the negative voltage generator 314 from shorting to a voltage source V1 through the positive voltage generator 316.

The negative voltage generator 314 includes a third node 322. A first diode D1 is electrically connected between the first node 308 and the third node 322. The first diode is biased toward the third node 322. The negative voltage generator further incudes a fourth node 324. A second diode D2 is electrically connected between the third node 322 and the fourth node 324. The second diode D2 is biased toward the fourth node 324. A third diode D3 is electrically connected between the fourth node 324 and ground 312. The third diode D3 is biased toward ground 312. In one example, the first diode D1, the second diode D2, and the third diode D3 are Schottky diodes. A first capacitor C1 is electrically connected between the first PWM signal generator PMW SG1 and the third node 322. A second capacitor C2 is electrically connected between the first PWM signal generator PWM SG1 and the fourth node 324.

In this example, the two instances of the first PWM signal generator PWM SG1 are schematically depicted as discrete voltage sources. However, in some implementations, the first PWM signal generator PWM SG1 may be integrated into a microcontroller unit, such as MCU 212 of FIG. 2. In such implementations, the PWM signal is output from the MCU 212 to the drive circuit 300.

The negative voltage generator 314 is configured to supply the negative voltage to the first node 308 based on the PWM signal generator PWM SG1 generating a negative voltage pulse (e.g., −1.8V). In particular, the negative voltage pulse charges the first capacitor C1 and the second capacitor C2. Once both of the first capacitor C1 and second capacitor C2 are charged, the negative voltage is supplied to the third node 322 and the fourth node 324. Further, a corresponding current flows through the second diode D2 to supply the negative voltage (e.g., −1.8V) supplied by the second capacitor C2 to the third node 322. The negative voltage supplied by the second capacitor C2 accumulates with the negative voltage (e.g., −1.8V) supplied by the first capacitor C1 at the third node 322. Further, the corresponding current flows through the first diode D1 to supply the accumulated negative voltage (e.g., −3.6V) to the positive voltage block 318.

In this example, the positive voltage block 318 includes an n-channel MOSFET M1 including a source 328 electrically connected to the negative voltage generator 314, a gate 330, and a drain 332 electrically connected to the first node 308. When the accumulated negative voltage is supplied to the source 328, the voltage at the gate 330 is higher than the voltage at the source 328, and the n-channel MOSFET turns on allowing current to flow and the accumulated negative voltage is supplied to the first node 308. Further, the negative voltage block 320 prevents the accumulated negative voltage from shorting through the positive voltage generator 316 to the voltage supply V1.

Furthermore, when the accumulated negative voltage is supplied from the first node 308, across the electrical connector 306, to the second node 310, the current flows across a first resistor R1 positioned between the first node 308 and the second node 310. The first resistor R1 lowers the accumulated voltage (−3.6V) to a negative activation voltage that is suitable to activate the first LED 302 while limiting the current flowing through the first LED 302. The negative activation voltage is supplied from the second node 310 tot the first LED 302 to activate the first LED 302. The second LED 304 is biased such that the negative activation voltage does not activate the second LED 304.

The positive voltage generator 316 includes a fifth node 334. A fourth diode D4 is electrically connected between the first node 308 and the fifth node 334. The fourth diode D4 is biased toward the first node 308. A fifth diode D5 is electrically connected between the voltage source V1 and the fifth node 334. The fifth diode D5 is biased toward the fifth node 334. In one example, the fourth diode D4 and the fifth diode D5 are Schottky diodes. A third capacitor C3 is electrically connected between the fifth node 334 and a second PWM signal generator PWM SG2.

In this example, the second PWM signal generator PWM SG2 is depicted as a discrete voltage source. However, in some implementations, the second PWM signal generator PWM SG2 may be integrated into a microcontroller unit, such as MCU 212 of FIG. 2. In such implementations, the PWM signal is output from the MCU 212 to the drive circuit 300. Moreover, the first PWM signal generator PWM SG1 and the second PWM signal generator PWM SG2 may output different PWM signals. For example, the different PWM signals may have different duty cycles and/or PWM frequencies.

The positive voltage generator 316 is configured to supply the positive voltage to the first node 308 based on the PWM signal generator PWM SG2 generating a positive voltage pulse (e.g., 1.8V). In particular, the voltage source V1 supplies a positive voltage (e.g., 1.8V) to the fifth diode D5. A corresponding current flows through the fifth diode D5 to supply the positive voltage to the fifth node 334. Meanwhile, the positive voltage pulse output by the second PWM signal generator PWM SG2 charges the third capacitor C3. Once the third capacitor C3 is charged, the positive voltage is supplied to the fifth node 334 and accumulates with the positive voltage (e.g., 1.8V) supplied by the voltage source V1. A corresponding current flows through the fourth diode D4 to supply the accumulated positive voltage (e.g., 3.6V) to the negative voltage block 320.

In this example, the negative voltage block 320 includes a p-channel MOSFET M2 including a source 338 electrically connected to the positive voltage generator 316, a gate 340, and a drain 342 electrically connected to the first node 308. When the accumulated positive voltage is supplied to the source 338, the voltage at the source 338 is higher than the voltage at the gate 340, and the p-channel MOSFET turns on allowing current to flow and the accumulated positive voltage is supplied to the first node 308. Further, the positive voltage block 318 prevents the accumulated positive voltage from shorting through the negative voltage generator 314 to ground.

The generator circuit 311 is provided as an example that is meant to be non-limiting. Any suitable circuit may be employed to alternatively provide a positive voltage and a negative voltage to the first node 308 to control activation of the first and second LEDs 302 and 304.

Furthermore, when the accumulated positive voltage is supplied from the first node 308, across the electrical connector 306, to the second node 310, the current flows across the first resistor R1 positioned between the first node 308 and the second node 310. The first resistor R1 lowers the accumulated voltage (3.6V) to a positive activation voltage that is suitable to activate the second LED 304 while limiting the current flowing through the second LED 304. The positive activation voltage is supplied from the second node 310 to the second LED 304 to activate the second LED 304. The first LED 302 is biased such that the positive activation voltage does not activate the first LED 302.

In some implementations, the drive circuit 300 optionally may include a second resistor R2 electrically intermediate the first LED 302 and ground 312 and a fourth capacitor C4 connected in parallel with the second resistor R2 and the first LED 302. The second resistor R2 and the fourth capacitor C4 may form a first-order RC circuit that extends a period in which the first LED 302 is active when the first LED 302 is no longer being supplied with the negative activation voltage from the second node 310. In particular, the fourth capacitor C4 acts as a temporary voltage source and discharges voltage for a short period of time. This additional voltage allows the first LED to remain activated. Such functionality smooths operation of the first LED and compensates for any temporary interruptions in voltage being supplied to the first LED. Further, the drive circuit 300 optionally may include a third resistor R3 electrically intermediate the second LED 304 and ground 312 and a fifth capacitor C5 connected in parallel with the third resistor R3 and the second LED 304. The third resistor R3 and the fifth capacitor C5 may operate in a similar manner for the second LED 304 as the second resistor R2 and the fourth capacitor C4 operate in relation to the first LED 302.

The resistors of the drive circuit 300 may have any suitable resistances. For example, the resistances of the resistors may be selected based on the type of LEDs that are being driven by the drive circuit 300. In particular, the resistances may be selected based on the current limits of the LEDs. Likewise, the supply voltage output by the voltage supply and the PWM signal generators may be any suitable voltage. For example, the supply voltage may be selected to be lower than the activation voltage of the LEDs in order to conserve battery power. As such, the different voltage generators are configured to double the supply voltage before providing it to the first node. Further, the capacitors of the drive circuit 300 may have any suitable capacitances. For example, the capacitances may be selected based on the supply voltage of the voltage supply and the PWM signal generators.

The drive circuit 300 is configured to selectively supply either a negative voltage to activate the first LED 302 or a positive voltage to activate the second LED 304. The drive circuit 300 is not capable of supplying the negative voltage to the first LED 302 and the positive voltage to the second LED 304 at the same time. However, the drive circuit 300 is configured to alternate between supplying the negative voltage and supplying the positive voltage. The frequency of the alternation may be fast enough that both of the first and second LEDs will be perceived as being activated at the same time.

The drive circuit 300 is provided as a non-limiting example. Other circuit configurations may be used to supply voltages to two LEDs connected in parallel to the same electrical connector. For example, in some implementations, the generator circuit may use inductors instead of capacitors for charging. Further, any suitable type of converter may be used to generate voltage in the generator circuit 311 of the drive circuit 300.

Although the drive circuit 300 is discussed in the context of supplying voltage to two LEDs in an active stylus, the drive circuit 300 may be employed in any suitable device that includes two LEDs connected in parallel to the same electrical connector.

In some implementations, a drive circuit configured to control operation of two LEDs may be located remotely from a microcontroller unit and/or a unified hardware core. For example, an arrangement of a stylus may not provide enough space in the front end for the drive circuit to be integrated into the unified hardware core. Instead, the drive circuit may be positioned in the tail end of the stylus and electrically connected to the microcontroller unit via an electrical connector. In such a configuration, the drive circuit may be configured to receive a control signal from the microcontroller unit via the electrical connector, and independently control the two LEDs based on the control signal.

Figure 4:
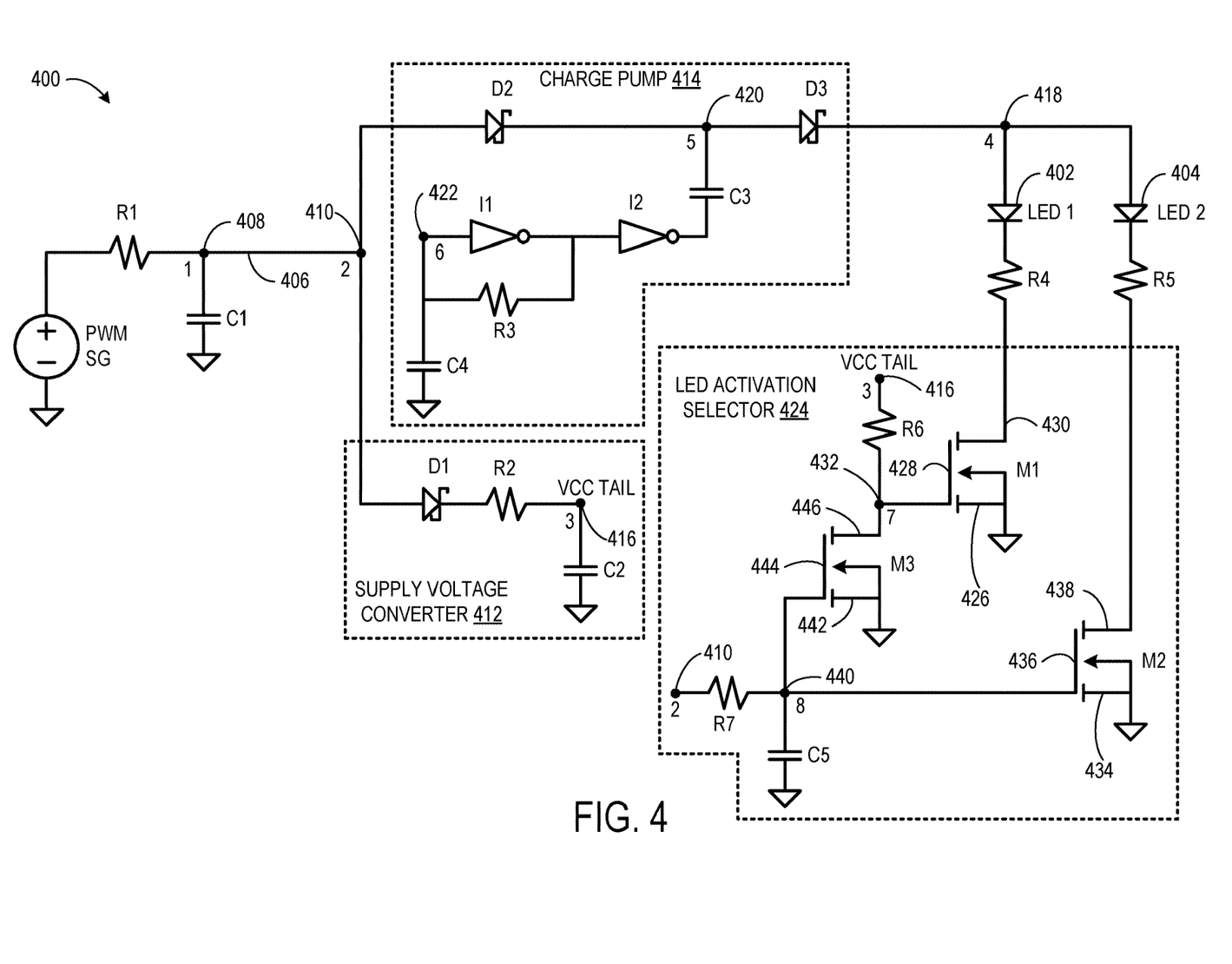
FIG. 4 shows a circuit configured to control activation of two LEDs based on a duty cycle of a control signal from a controller.

FIG. 4 schematically shows an example drive circuit 400 configured to independently control a first LED 402 and a second LED 404 both connected to the drive circuit 400. For example, the drive circuit 400 may be implemented in the stylus 200 to connect the two LEDs 236 and 238 to the microcontroller 212. In this example, a PWM signal generator PWM SG is depicted as a discrete voltage source configured to output a PWM signal. However, in some implementations, the PWM signal generator may be integrated into a microcontroller unit, such as MCU 212 of FIG. 2. In such implementations, the PWM signal is output from the MCU 212 to the drive circuit 400. The PWM SG is electrically connected to a first resistor R1. The first resistor R1 is electrically connected between the PWM SG and a first node 408. A first capacitor C1 is electrically intermediate the first node 410 and ground. The first resistor R1 and the first capacitor C1 may be sized based upon the PWM signal (e.g., voltage) output by the PWM SG.

The first node 408 is formed at a first end of an electrical connector 406 and a second node 410 formed at a second, opposing end of the electrical connector 406. In other words, the electrical connector 406 electrically connects the first node 408 to the second node 410. In the implementation of FIG. 2, electrical connector 240 is analogous to electrical connector 406. Like electrical connector 240, electrical connector 406 optionally may include a selective break, for example to allow a stylus to be opened for battery insertion.

A supply voltage converter 412 is electrically connected to the second node 410. The supply voltage converter 412 is configured to convert the PWM signal received from the PWM SG to a direct current (DC) signal. The DC signal may act as a supply voltage (e.g., VCC TAIL) for the components of the drive circuit 400 in the tail end of the stylus. The supply voltage converter 412 includes a first diode D1 electrically connected between the first node 410 and a second resistor R2. The second resistor R2 is connected to a third node 416. A second capacitor C2 is electrically connected between the third node 416 and ground. The second resistor R1 and the second capacitor C2 form a low-pass filter that converts the PWM signal output by the PWM SG to a DC signal having a voltage VCC TAIL that is supplied to the third node 416. The supply voltage converter 412 may include any suitable components to convert the PWM signal to a DC signal.

A charge pump 414 is electrically intermediate the second node 410 and a fourth node 418. The charge pump 414 is electrically connected to the second node 410 in parallel with the supply voltage converter 412. The charge pump 414 is configured to convert the PWM signal received from the PWM SG to a DC signal that is boosted to twice the supply voltage (e.g., VCC TAIL). The higher voltage is used to activate the LEDs 402 and 404, because the threshold activation voltage for the LEDs 402 and 404 is higher than the supply voltage of the circuit 400.

The charge pump 414 includes a second diode D2 electrically connected to the second node 410 and a fifth node 420. A third diode D3 is electrically connected to the fifth diode 420 and the third diode 418. A first inverter I1 is electrically connected between a sixth node 422 and a second inverter I2. A third capacitor C3 is electrically intermediate the second inverter I2 and the fifth node 420. A third resistor R3 is electrically connected to the sixth node 422 in parallel with the first inverter I1. A fourth capacitor C4 is electrically connected between the sixth node 422 and ground. The charge pump 414 operates in two-stages. In the first stage, voltage is supplied to the fourth capacitor C4 to charge the fourth capacitor C4. In the second stage, the fourth capacitor C4 discharges to charge the third capacitor C3 to double the supply voltage. Further, the third capacitor C3 discharges to supply the boosted voltage to the fourth node 418. The two-stages of operation of the charge pump 414 are controlled based on the PWM signal from the PWM SG.

The charge pump 414 is provided as an example of a circuit that is configured to convert the PWM signal to a DC signal having a voltage that is boosted from the supply voltage in order to drive the LEDs 402 and 404. Any suitable circuit may be employed to convert the PWM signal to a DC signal having a boosted voltage.

The first LED 402 is electrically connected intermediate the fourth node 418 and a fourth resistor R4. Likewise, the second LED 404 is electrically intermediate the forth node and a fifth resistor R5. The first and second LEDs 402 and 404 are electrically intermediate the fourth node 418 and an LED activation selector 424. The LED activation selector 424 is configured to selectively activate the first LED 402 or the second LED 404 based on the PWM signal.

The LED activation selector 424 includes a first n-channel MOSFET M1, a second n-channel MOSFET M2, and a third n-channel MOSFET M3. The first n-channel MOSFET M1 includes a source 426 electrically connected to ground, a gate 428 electrically connected to a seventh node 432, and a drain 430 electrically connected to the fourth resistor R4. The second n-channel MOSFET M2 includes a source 434 electrically connected to ground, a gate 436 electrically connected to an eighth node 440, and a drain 438 electrically connected to the fifth resistor R5. The third n-channel MOSFET M3 includes a source 442 electrically connected to ground, a gate 444 electrically connected to the eighth node 440, and a drain 446 electrically connected to the seventh node 432. A sixth resistor R6 is electrically connected between the seventh node 432 and the third node 416 such that the supply voltage VCC TAIL is supplied to the LED activation selector 424. A seventh resistor R7 is electrically intermediate the second node 410 and the eight node 440. A fifth capacitor C5 is electrically intermediate the eighth node 440 and ground.

In one example, the LED activation selector 424 is configured to activate the first LED 402 or the second LED 404 based on the duty cycle of the PWM signal. In particular, when the DC signal is transmitted (0 Hz) from the MCU, the output of the supply voltage converter 412 outputs 1.8 V and the second MOSFET M2 is turned on. When the second MOSFTET M2 is turned on, voltage is supplied to the second LED 404 to activate the second LED 404. On the other hand, when the rectangular wave is transmitted (100 Khz) from the MCU, the supply voltage converter 412 outputs 0.9V. The gate-to-source voltage threshold of the second MOSFET M2 is higher than 0.9V so the second MOSFTET is not turned on and the second LED 404 remains off. The first MOSFET M1 is supplied with the 1.8V supply voltage and is turned on. When the first MOSFET M1 is turned on, voltage is supplied to the first LED 402 to activate the first LED. In this example, a duty cycle range between 10% and 50% is used to activate the first LED 402 and a duty cycle range between 50% and 90% is used activate the second LED 404. Any suitable different duty cycle ranges may be used to control activation of the first and second LEDs 402 and 404 via the circuit 400.

In some implementations, the circuit 400 may be configured to additionally control the brightness of the first and second LEDs 402 and 404 based on the duty cycle of the PWM signal. For example, if the duty cycle range is between 10% and 50% to activate the first LED 402, then the duty cycle can be set to 10% to drive maximum power to the first LED 402 and the duty cycle can be set to 50% to drive minimum power to the first LED 402. A linear or any other interpolation can be used to determine the appropriate amount of power at each duty cycle in the activation range. Further, if the duty cycle range is between 50% and 90% to activate the second LED 404, then the duty cycle can be set to 50% to drive minimum power to the second LED 404 and the duty cycle can be set to 90% drive maximum power to the second LED 404. A linear or any other interpolation can be used to determine the appropriate amount of power at each duty cycle in the activation range.

In some implementations, the circuit 400 may be configured to control activation of the first and second LEDs 402 and 404 based on the frequency of the PWM signal. For example, a frequency range between 1 KHz and 2 KHz may be used to activate the first LED 402, and a frequency range between 2.5 and 3.5 KHz may be used to activate the second LED 404. Further, the circuit 400 may be configured to additionally control the brightness of the first and second LEDs 402 and 404 based on the frequency of the PWM signal. For example, if the frequency range is between 1 KHz and 2 KHz to activate the first LED 402, then the frequency can be set to 1 KHz to drive maximum power to the first LED 402 and the frequency can be set to 2 KHz to drive minimum power to the first LED 402. A linear or any other interpolation can be used to determine the appropriated amount of power at each frequency in the activation range. Further, if the frequency range is between 2.5 KHz and 3.5 KHz to activate the second LED 404, then the frequency can be set to 2.5 KHz to drive minimum power to the second LED 404 and the frequency can be set to 3.5 KHz to drive maximum power to the second LED 404. A linear or any other interpolation can be used to determine the power at each frequency.

The above described duty cycle and frequency ranges are provided as examples that are meant to be non-limiting. Any suitable ranges can be used to control activation and brightness of the LEDs.

In an example, active stylus comprises an elongate gripping member having a first end and a second end and a circuit housed within the elongate gripping member. The circuit comprises a first node positioned in the first end, a generator circuit positioned in the first end and electrically connected to the first node, a second node positioned in the second end, an electrical connector electrically connecting the first node to the second node, a first light emitting diode (LED) positioned in the second end of the elongate gripping member and electrically intermediate the second node and ground, and a second LED positioned in the second end of the elongate gripping member and electrically intermediate the second node and ground in parallel with the first LED. The first LED is configured to activate based on the generator circuit supplying a negative voltage to the second node via the first node. The second LED is configured to activate based on the generator circuit supplying a positive voltage to the second node via the first node. The stylus further comprises a controller housed within the first end of the elongate gripping member and configured to generate, via a first pulse-width-modulated (PWM) signal generator, a first PWM signal to control the negative voltage generator to provide the negative voltage to activate the first LED, and generate, via a second PWM signal generator, a second PWM signal to control the positive voltage generator to provide the positive voltage to activate the second LED. In this example and/or other examples, the controller may be further configured to adjust one or more of a first duty cycle and a first PWM frequency of the first PWM signal to adjust the perceived brightness of the first LED, and adjust one or more of a second duty cycle and a second PWM frequency of the second PWM signal to adjust the perceived brightness of the second LED. In this example and/or other examples, the generator circuit may include a negative voltage generator electrically connected to the first node and configured to generate the negative voltage, and a positive voltage generator electrically connected to the first node in parallel with the negative voltage generator and configured to generate the positive voltage. In this example and/or other examples, the negative voltage generator may include a third node, a first diode electrically connected between the first node and the third node, the first diode biased toward the third node, a fourth node, a second diode electrically connected between the third node and the fourth node, the second diode biased toward the fourth node, a third diode electrically connected between the fourth node and ground, the third diode biased toward ground, a first capacitor electrically connected between the first PWM signal generator and the third node, and a second capacitor electrically connected between the first PWM signal generator and the fourth node. In this example and/or other examples, the positive voltage generator may include a fifth node a fourth diode electrically connected between the first node and the fifth node, the fourth diode biased toward the first node, a fifth diode electrically connected between a voltage source and the fifth node, the fifth diode biased toward the fifth node, and a third capacitor electrically connected between the fifth node and the second PWM signal generator of the controller. In this example and/or other examples, the active stylus may further comprise a positive voltage block positioned intermediate the negative voltage generator and the first node and configured to prevent the positive voltage produced by the positive voltage generator from shorting to ground through the negative voltage generator. In this example and/or other examples, the positive voltage block may include an n-channel MOSFET including a source electrically connected to the negative voltage generator and a drain electrically connected to the first node. In this example and/or other examples, the active stylus may further comprise a negative voltage block positioned intermediate the positive voltage generator and the first node and configured to prevent the negative voltage produced by the negative voltage generator from shorting to a voltage source through the positive voltage generator. In this example and/or other examples, the negative voltage block may include a p-channel MOSFET including a source electrically connected to the positive voltage generator and a drain electrically connected to the first node. In this example and/or other examples, the first end may be a front end terminating at a writing tip and the second end may be a tail end. In this example and/or other examples, one or more of the first end and the second end may form a battery compartment within the elongate gripping member, the elongate gripping member may form a mechanical break intermediate the first end and the second end, and the mechanical break may enable physical separation of the first end from the second end to allow access to the battery compartment. In this example and/or other examples, the elongate gripping member may include metal, and the elongate gripping member may electrically connect to the circuit to serve as ground for the circuit.

In an example, a circuit, comprises a first node, a negative voltage generator electrically connected to the first node, a positive voltage generator electrically connected to the first node in parallel with the negative voltage generator, a second node, an electrical connector electrically connecting the first node to the second node, a first light emitting diode (LED) electrically intermediate the second node and ground, the first LED configured to activate based on the negative voltage generator supplying a negative voltage to the second node via the first node, and a second LED electrically intermediate the second node and ground in parallel with the first LED, the second LED configured to activate based on the positive voltage generator supplying a positive voltage to the second node via the first node. In this example and/or other examples, the circuit may further comprise a controller configured to generate, via a first pulse-width-modulated (PWM) signal generator, a first PWM signal to control the negative voltage generator to provide the negative voltage to activate the first LED, and generate, via a second PWM signal generator, a second PWM signal to control the positive voltage generator to provide the positive voltage to activate the second LED. In this example and/or other examples, the controller may be further configured to adjust one or more of a first duty cycle and a first PWM frequency of the first PWM signal to adjust the perceived brightness of the first LED, and adjust one or more of a second duty cycle and a second PWM frequency of the second PWM signal to adjust the perceived brightness of the second LED. In this example and/or other examples, the negative voltage generator may include a third node, a first diode electrically connected between the first node and the third node, the first diode biased toward the third node, a fourth node, a second diode electrically connected between the third node and the fourth node, the second diode biased toward the fourth node, a third diode electrically connected between the forth node and ground, the third diode biased toward ground, a first capacitor electrically connected between the first PWM signal generator and the third node, and a second capacitor electrically connected between the first PWM signal generator and the fourth node. In this example and/or other examples, the positive voltage generator may include a fifth node, a fourth diode electrically connected between the first node and the fifth node, the fourth diode biased toward the first node, a fifth diode electrically connected between a voltage source and the fifth node, the fifth diode biased toward the fifth node, and a third capacitor electrically connected between the fifth node and the second PWM signal generator of the controller. In this example and/or other examples, the circuit may further comprise a positive voltage block positioned intermediate the negative voltage generator and the first node and configured to prevent the positive voltage produced by the positive voltage generator from shorting to ground through the negative voltage generator. In this example and/or other examples, the circuit may further comprise a negative voltage block positioned intermediate the positive voltage generator and the first node and configured to prevent the negative voltage produced by the negative voltage generator from shorting to a voltage source through the positive voltage generator.

In an example, an active stylus comprises an elongate gripping member having a first end and a second end, a circuit housed within the elongate gripping member and a circuit. The circuit comprises a first node, a negative voltage generator positioned in the first end and electrically connected to the first node, a positive voltage generator positioned in the first end and electrically connected to the first node in parallel with the positive voltage generator, a negative voltage block positioned intermediate the positive voltage generator and the first node and configured to prevent the negative voltage produced by the negative voltage generator from shorting to a voltage source through the positive voltage generator, a positive voltage block positioned intermediate the negative voltage generator and the first node and configured to prevent the positive voltage produced by the positive voltage generator from shorting to ground through the negative voltage generator, a second node, an electrical connector electrically connecting the first node to the second node, a first light emitting diode (LED) positioned in the second end of the elongate gripping member and electrically intermediate the second node and ground, and a second LED positioned in the second end of the elongate gripping member and electrically intermediate the second node and ground in parallel with the first LED. The first LED is configured to activate based on the negative voltage generator supplying a negative voltage to the second node via the first node. The second LED is configured to activate based on the positive voltage generator supplying a positive voltage to the second node via the first node. The stylus further comprises a controller housed within the first end of the elongate gripping member and configured to generate, via a first pulse-width-modulated (PWM) signal generator, a first PWM signal to control the negative voltage generator to provide the negative voltage to activate the first LED, and generate, via a second PWM signal generator, a second PWM signal to control the positive voltage generator to provide the positive voltage to activate the second LED. In this example and/or other examples, the negative voltage generator may include a third node, a first diode electrically connected between the first node and the third node, the first diode biased toward the third node, a fourth node, a second diode electrically connected between the third node and the fourth node, the second diode biased toward the fourth node, a third diode electrically connected between the forth node and ground, the third diode biased toward ground, a first capacitor electrically connected between the first PWM signal generator and the third node, and a second capacitor electrically connected between the first PWM signal generator and the fourth node. In this example and/or other examples, the positive voltage generator may include a fifth node, a fourth diode electrically connected between the first node and the fifth node, the fourth diode biased toward the first node, a fifth diode electrically connected between a voltage source and the fifth node, the fifth diode biased toward the fifth node, a third capacitor electrically connected between the fifth node and the second PWM signal generator of the controller.

It will be understood that the configurations and/or approaches described herein are exemplary in nature, and that these specific implementations or examples are not to be considered in a limiting sense, because numerous variations are possible. The subject matter of the present disclosure includes all novel and non-obvious combinations and subcombinations of the various processes, systems and configurations, and other features, functions, acts, and/or properties disclosed herein, as well as any and all equivalents thereof.

The invention claimed is:

1. An active stylus comprising:
   an elongate gripping member having a first end and a second end, wherein the first end is selectively separable from the second end at a mechanical break to allow access to a battery compartment;
   a circuit housed within the elongate gripping member, the circuit comprising:
   a first node positioned in the first end;
   a generator circuit positioned in the first end and electrically connected to the first node;
   a second node positioned in the second end;
   an electrical connector electrically connecting the first node to the second node, wherein the electrical connector includes an electrical break that selectively electrically separates the first node and the second node based on the first end being separated from the second end at the mechanical break;
   a first light emitting diode (LED) positioned in the second end of the elongate gripping member and electrically intermediate the second node and ground, the first LED configured to activate based on the generator circuit supplying a negative voltage to the second node via the first node; and
   a second LED positioned in the second end of the elongate gripping member and electrically intermediate the second node and ground in parallel with the first LED, the second LED configured to activate based on the generator circuit supplying a positive voltage to the second node via the first node; and
   a controller housed within the first end of the elongate gripping member and configured to:
   generate, via a first pulse-width-modulated (PWM) signal generator, a first PWM signal to control the generator circuit to provide the negative voltage to activate the first LED; and
   generate, via a second PWM signal generator, a second PWM signal to control the generator circuit to provide the positive voltage to activate the second LED.

2. The active stylus of claim 1, wherein the controller is further configured to:
   adjust one or more of a first duty cycle and a first PWM frequency of the first PWM signal to adjust the perceived brightness of the first LED; and
   adjust one or more of a second duty cycle and a second PWM frequency of the second PWM signal to adjust the perceived brightness of the second LED.

3. The active stylus of claim 1, wherein the generator circuit includes a negative voltage generator electrically connected to the first node and configured to generate the negative voltage, and a positive voltage generator electrically connected to the first node in parallel with the negative voltage generator and configured to generate the positive voltage.

4. The active stylus of claim 3, wherein the negative voltage generator includes:
a third node;
a first diode electrically connected between the first node and the third node, the first diode biased toward the third node;
a fourth node;
a second diode electrically connected between the third node and the fourth node, the second diode biased toward the fourth node;
a third diode electrically connected between the fourth node and ground, the third diode biased toward ground;
a first capacitor electrically connected between the first PWM signal generator and the third node; and
a second capacitor electrically connected between the first PWM signal generator and the fourth node.

5. The active stylus of claim 3, wherein the positive voltage generator includes:
a fifth node;
a fourth diode electrically connected between the first node and the fifth node, the fourth diode biased toward the first node;
a fifth diode electrically connected between a voltage source and the fifth node, the fifth diode biased toward the fifth node; and
a third capacitor electrically connected between the fifth node and the second PWM signal generator of the controller.

6. The active stylus of claim 3, further comprising:
a positive voltage block positioned intermediate the negative voltage generator and the first node and configured to prevent the positive voltage produced by the positive voltage generator from shorting to ground through the negative voltage generator.

7. The active stylus of claim 6, wherein the positive voltage block includes an n-channel MOSFET including a source electrically connected to the negative voltage generator and a drain electrically connected to the first node.

8. The active stylus of claim 3, further comprising:
a negative voltage block positioned intermediate the positive voltage generator and the first node and configured to prevent the negative voltage produced by the negative voltage generator from shorting to a voltage source through the positive voltage generator.

9. The active stylus of claim 8, wherein the negative voltage block includes a p-channel MOSFET including a source electrically connected to the positive voltage generator and a drain electrically connected to the first node.

10. The active stylus of claim 1, wherein one or more of the first end and the second end form a battery compartment within the elongate gripping member, wherein the elongate gripping member forms a mechanical break intermediate the first end and the second end, and wherein the mechanical break enables physical separation of the first end from the second end to allow access to the battery compartment.

11. The active stylus of claim 1, wherein the elongate gripping member includes metal, and wherein the elongate gripping member electrically connects to the circuit to serve as ground for the circuit.

12. A circuit, comprising:
a first node;
a negative voltage generator electrically connected to the first node;
a positive voltage generator electrically connected to the first node in parallel with the negative voltage generator;
a second node;
an electrical connector electrically connecting the first node to the second node;
a first light emitting diode (LED) electrically intermediate the second node and ground, the first LED configured to activate based on the negative voltage generator supplying a negative voltage to the second node via the first node;
a second LED electrically intermediate the second node and ground in parallel with the first LED, the second LED configured to activate based on the positive voltage generator supplying a positive voltage to the second node via the first node;
a third node;
a first diode electrically connected between the first node and the third node, the first diode biased toward the third node;
a fourth node;
a second diode electrically connected between the third node and the fourth node, the second diode biased toward the fourth node;
a third diode electrically connected between the forth node and ground, the third diode biased toward ground;
a first capacitor electrically connected between the first PWM signal generator and the third node; and
a second capacitor electrically connected between the first PWM signal generator and the fourth node; and
a controller configured to:
generate, via a first pulse-width-modulated (PWM) signal generator, a first PWM signal having a first PWM frequency to control the negative voltage generator to provide the negative voltage to activate the first LED; and
generate, via a second PWM signal generator, a second PWM signal independent of the first PWM signal, the second PWM signal having a second PWM frequency, to control the positive voltage generator to provide the positive voltage to activate the second LED, wherein the first PWM frequency and the second PWM frequency are independently adjustable.

13. The circuit of claim 12, wherein the controller is further configured to:
adjust one or more of a first duty cycle and the first PWM frequency of the first PWM signal to adjust the perceived brightness of the first LED; and
adjust one or more of a second duty cycle and the second PWM frequency of the second PWM signal to adjust the perceived brightness of the second LED.

14. The circuit of claim 12, wherein the positive voltage generator includes:
a fifth node;
a fourth diode electrically connected between the first node and the fifth node, the fourth diode biased toward the first node;
a fifth diode electrically connected between a voltage source and the fifth node, the fifth diode biased toward the fifth node; and
a third capacitor electrically connected between the fifth node and the second PWM signal generator of the controller.

15. The circuit of claim 12, further comprising:
a positive voltage block positioned intermediate the negative voltage generator and the first node and configured to prevent the positive voltage produced by the positive voltage generator from shorting to ground through the negative voltage generator.

16. The circuit of claim 12, further comprising:
a negative voltage block positioned intermediate the positive voltage generator and the first node and configured to prevent the negative voltage produced by the negative voltage generator from shorting to a voltage source through the positive voltage generator.

17. An active stylus comprising:
an elongate gripping member having a first end and a second end, wherein the first end is selectively separable from the second end at a mechanical break;
a circuit housed within the elongate gripping member, the circuit comprising:
  a first node in the first end;
  a second node in the second end;
  an electrical connector electrically connecting the first node to the second node, wherein the electrical connector includes an electrical break that selectively electrically separates the first node and the second node based on the first end being separated from the second end at the mechanical break;
  a first light emitting diode (LED) positioned in the second end of the elongate gripping member and electrically intermediate the second node and ground, the first LED configured to activate based on a negative voltage applied to the second node via the first node; and
  a second LED positioned in the second end of the elongate gripping member and electrically intermediate the second node and ground in parallel with the first LED, the second LED configured to activate based on a positive voltage applied to the second node via the first node.

18. The active stylus of claim 17, further comprising:
an electrode tip coupled to the first end of the elongate gripping member;
a controller housed within the first end of the elongate gripping member and configured to apply the negative voltage to the second node via the first node, and to apply the positive voltage to the second node via the first node.

* * * * *